United States Patent
Bueno Melendo et al.

(10) Patent No.: US 12,454,511 B2
(45) Date of Patent: Oct. 28, 2025

(54) 6-METHOXY-3,4-DIHYDRO-1H-ISOQUINOLIN COMPOUNDS

(71) Applicant: Eli Lilly and Company, Indianapolis, IN (US)

(72) Inventors: Ana Belén Bueno Melendo, Alcobendas (ES); Jayana Pankajkumar Lineswala, Brownsburg, IN (US); Gema Ruano Plaza, Alcobendas (ES); Nuria Diaz Buezo, Madrid (ES)

(73) Assignee: ELI LILLY AND COMPANY, Indianapolis, IN (US)

( * ) Notice: Subject to any disclaimer, the term of this patent is extended or adjusted under 35 U.S.C. 154(b) by 437 days.

(21) Appl. No.: 18/247,939

(22) PCT Filed: Oct. 6, 2021

(86) PCT No.: PCT/US2021/053691
§ 371 (c)(1),
(2) Date: Apr. 5, 2023

(87) PCT Pub. No.: WO2022/076503
PCT Pub. Date: Apr. 14, 2022

(65) Prior Publication Data
US 2023/0373927 A1  Nov. 23, 2023

(30) Foreign Application Priority Data
Oct. 8, 2020 (EP) .................................... 20382887

(51) Int. Cl.
*C07D 217/04* (2006.01)
*A61P 3/10* (2006.01)
*C07D 217/16* (2006.01)

(52) U.S. Cl.
CPC .............. *C07D 217/04* (2013.01); *A61P 3/10* (2018.01); *C07D 217/16* (2013.01)

(58) Field of Classification Search
CPC ........ C07D 217/04; C07D 217/16; A61P 3/10
See application file for complete search history.

(56) References Cited

U.S. PATENT DOCUMENTS

| | | | |
|---|---|---|---|
| 2019/0161448 A1* | 5/2019 | Adams | C07D 401/06 |
| 2019/0225604 A1* | 7/2019 | Yoshino | A61P 25/28 |
| 2020/0317619 A1* | 10/2020 | Brown | A61K 45/06 |

FOREIGN PATENT DOCUMENTS

| | | |
|---|---|---|
| WO | 2010/114824 | 10/2010 |
| WO | 2017/201683 | 11/2017 |

OTHER PUBLICATIONS

Willard; Exp. Diabetes Res., 2012, 709893. https://doi.org/10.1155/2012/709893 (Year: 2012).*

International Search Report of the International Searching Authority pertaining to International Application No. PCT/US2021/053691; Date of Mailing: Dec. 10, 2021; 6 pages.
Written Opinion of the International Searching Authority pertaining to International Application No. PCT/US2021/053691; Date of Mailing: Dec. 10, 2021; 6 pages.

* cited by examiner

*Primary Examiner* — Daniel R Carcanague
(74) *Attorney, Agent, or Firm* — MaCharri Vorndran-Jones

(57) ABSTRACT

In an embodiment, the present invention provides a compound of the formula:

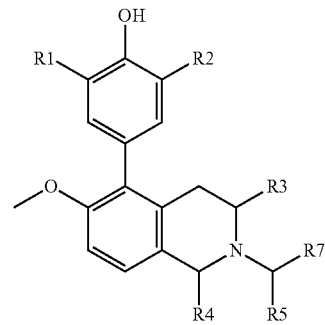

wherein
R1 is selected from the group consisting of F and H;
R2 is selected from the group consisting of $CH_3$, $CH_3CHCH_3$ and $-NHCH_2CH(CH_3)_2$;
R3 is selected from the group consisting of H and $-CH_2OCH_3$;
R4 is selected from the group consisting of H and $CH_3$;
R5 is selected from the group consisting of H and $CH_3$;
R6 is selected from the group consisting of H and OH;
R7 is selected from the group consisting of

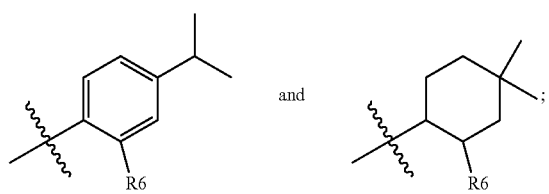

or
a pharmaceutically acceptable salt thereof, and methods of using this compound for positive allosteric modulation of a receptor selected from the group consisting of GLP1, GIP, and glucagon.

22 Claims, No Drawings

6-METHOXY-3,4-DIHYDRO-1H-ISOQUINOLIN COMPOUNDS

This invention relates to 6-methoxy-3,4-dihydro-1H-isoquinolin compounds, glucagon-like peptide-1 receptor agonists, glucose-dependent insulinotropic polypeptide (GIP) agonists, glucagon agonists, and therapeutic uses of the compounds to treat type II diabetes mellitus.

Allosteric modulators are agents that remotely alter the interactions of ligands with their receptors by modifying the ligand-binding environment. An example of this type of modulation is when the binding of a modulator to an allosteric (secondary) site produces a conformational change in the receptor protein that is transmitted to the ligand's orthosteric (primary) binding site. The quality of the allosteric effect is said to be positive if the modulator facilitates or potentiates an interaction of the ligand with the orthosteric binding site. The allosteric effect may be useful in characterization and crystallization of ligand binding in the orthosteric binding site.

Compounds provided are positive allosteric modulators (PAMs) of the Glucagon-like-peptide-1 (GLP-1) receptor. Compounds provided are positive allosteric modulators (PAMs) of the glucose-dependent insulinotropic polypeptide (GIP) receptor. Compounds provided are positive allosteric modulators (PAMs) of the glucagon receptor. GLP-1 is a member of the incretin family of peptide hormones secreted by intestinal enteroendocrine L-cells. GLP-1 induces the release of insulin from beta cells in a glucose dependent manner. GLP-1 agonists have been approved to treat type II diabetes mellitus; however, there is a need for alternative GLP-1 agonist treatments and binding characterization. There is a desire for GIP binding characterization.

In an embodiment, the present invention provides novel compounds, which are potent positive allosteric modulators of GLP-1R and/or GIPR and/or glucagon receptor.

In an embodiment, the present invention provides a compound of the formula:

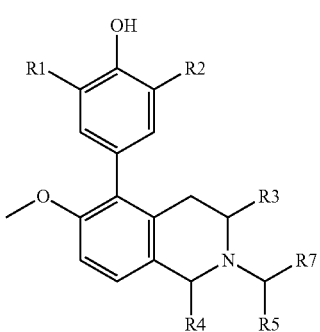

Formula II wherein
R1 is selected from the group consisting of F and H;
R2 is selected from the group consisting of $CH_3$, $CH_3CHCH_3$ and $—NHCH_2CH(CH_3)_2$;
R3 is selected from the group consisting of H and $—CH_2OCH_3$;
R4 is selected from the group consisting of H and $CH_3$;
R5 is selected from the group consisting of H and $CH_3$;
R6 is selected from the group consisting of H and OH;
R7 is selected from the group consisting of

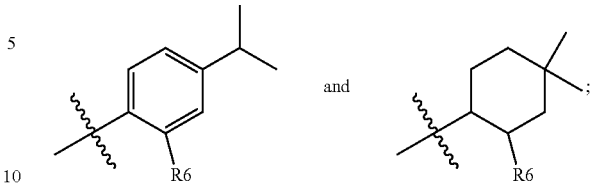

or
a pharmaceutically acceptable salt thereof.

In an embodiment, the present invention provides a compound of the formula:

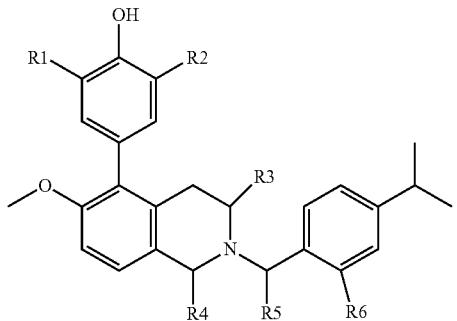

Formula I wherein
R1 is selected from the group consisting of F and H;
R2 is selected from the group consisting of $CH_3$ and $—NHCH_2CH(CH_3)_2$;
R3 is selected from the group consisting of H and $—CH_2OCH_3$;
R4 is selected from the group consisting of H and $CH_3$;
R5 is selected from the group consisting of H and $CH_3$;
R6 is selected from the group consisting of H and OH; or
a pharmaceutically acceptable salt thereof.

In an embodiment is a compound of Formula I or Formula II wherein R4 is $CH_3$, or a pharmaceutically acceptable salt thereof.

In an embodiment is a compound as of Formula I or Formula II wherein R5 is $CH_3$, or a pharmaceutically acceptable salt thereof.

In an embodiment is a compound of Formula I or Formula II wherein R6 is H, or a pharmaceutically acceptable salt thereof.

In an embodiment is a compound of Formula I or Formula II wherein R1 is F, or a pharmaceutically acceptable salt thereof.

In an embodiment is a compound of Formula I or Formula II wherein R3 is H, or a pharmaceutically acceptable salt thereof.

In an embodiment is a compound of Formula I or Formula II wherein R4 is $CH_3$, R5 is $CH_3$, and R6 is H, or a pharmaceutically acceptable salt thereof.

In an embodiment is a compound of Formula I or Formula II wherein R4 is $CH_3$, R5 is $CH_3$, R6 is H, R1 is F, and R3 is H, or a pharmaceutically acceptable salt thereof.

In an embodiment is a compound of Formula I or Formula II wherein R2 is $NHCH_2CH(CH_3)_2$, or a pharmaceutically acceptable salt thereof.

In an embodiment is a compound of Formula I or Formula II wherein R2 is $CH_3$, or a pharmaceutically acceptable salt thereof.

In an embodiment is a compound of Formula I wherein the compound is selected from the group consisting of Formula Ia

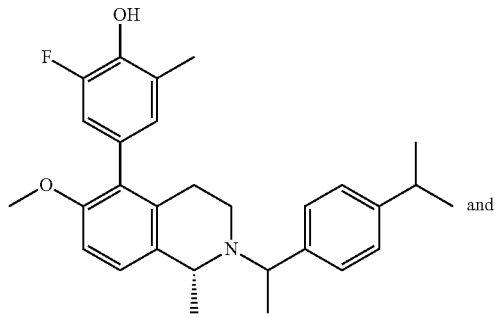

and

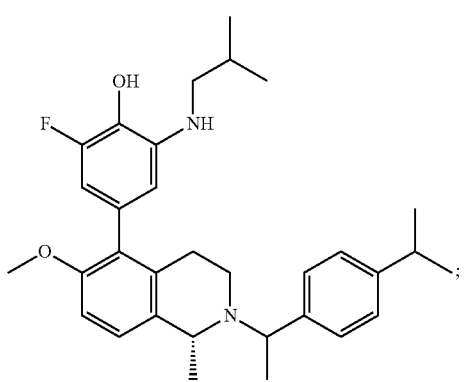

or a pharmaceutically acceptable salt thereof.

In an embodiment is a compound of the formula:

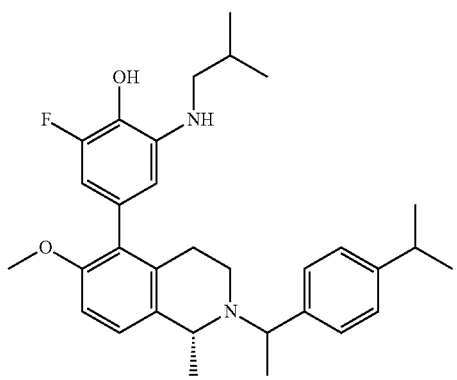 [SMILES: COc1ccc2c(c1-c1cc(F)c(O)c(NCC(C)C)c1)CCN(C(C)c1ccc(C(C)C)cc1)[C@@H]2C]

Formula Ib, or a pharmaceutically acceptable salt thereof.

In an embodiment is a compound of the formula:

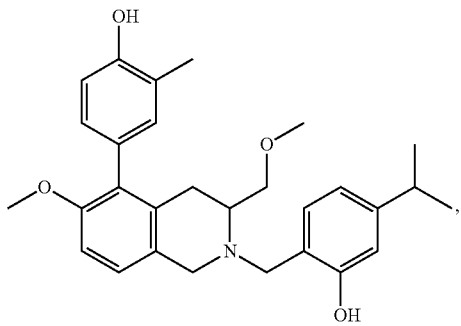 [SMILES: COCC1Cc2c(ccc(OC)c2-c2ccc(O)c(C)c2)CN1Cc1ccc(C(C)C)cc1O]

or a pharmaceutically acceptable salt thereof.

In an embodiment is a compound of the formula:

Ic

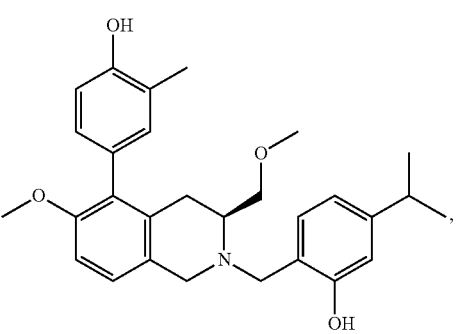

or a pharmaceutically acceptable salt thereof.

In an embodiment is a compound of the formula I, wherein the compound is a hydrochloride salt.

In an embodiment is a compound of the Formula II, wherein the compound is, or

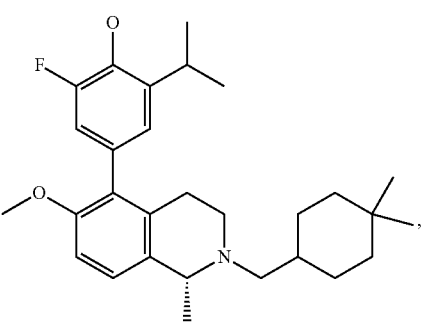

or a pharmaceutically acceptable salt thereof.

In an embodiment is a pharmaceutical composition comprising a compound, or a pharmaceutically acceptable salt thereof, of Formula I or Formula II and at least one pharmaceutically acceptable carrier, diluent, or excipient.

In an embodiment is a method for treating type II diabetes mellitus in a mammal comprising administering to the mammal an effective amount of a compound of Formula I or Formula II, or a pharmaceutically acceptable salt thereof.

In an embodiment is a compound, or a pharmaceutically acceptable salt thereof, of Formula I for use in therapy.

In an embodiment is a compound, or a pharmaceutically acceptable salt thereof, of Formula I or Formula II, for use in the treatment of type II diabetes mellitus.

In an embodiment is a use of a compound, or a pharmaceutically acceptable salt thereof, of Formula I or Formula II in the manufacture of a medicament for the treatment of type II diabetes mellitus.

Formula II and Formula I includes all individual enantiomers, and mixtures thereof, as well as racemates and pharmaceutically acceptable salts thereof.

In another embodiment, the present invention also provides a pharmaceutically acceptable composition comprising a compound of Formula I or Formula II, or a pharmaceutically acceptable salt thereof, and at least one of a pharmaceutically acceptable carrier, diluent or excipient. In a preferred embodiment, the pharmaceutically acceptable composition is formulated for oral administration.

In another embodiment, the present invention provides a method of treating a mammal for type II diabetes mellitus, the method comprises administering to the mammal in need of treatment a pharmaceutically acceptable composition comprising an effective amount of a compound of Formula I, or a pharmaceutically acceptable salt thereof, and at least one of a pharmaceutically acceptable carrier, diluent or excipient. Preferably the mammal is a human.

In another embodiment, the present invention also provides a method for treating a mammal for type II diabetes mellitus, the method comprises administering to the mammal in need of treatment an effective amount of a compound according to Formula I or Formula II, or a pharmaceutically acceptable salt thereof.

A compound of Formula I may be used in combination with other compounds that are used in the treatment of the diseases or conditions for which compounds of Formula I or Formula II are useful including type II diabetes mellitus In another embodiment, the present invention also provides a method of lowering blood glucose levels in a mammal, the method comprises administering to the mammal in need of treatment an effective amount of a compound according to Formula II or Formula I, or a pharmaceutically acceptable salt thereof.

In another embodiment, the present invention also provides a method of treating hyperglycemia in a mammal, the method comprises administering to the mammal in need of treatment an effective amount of a compound according to Formula I, or a pharmaceutically acceptable salt thereof.

In an embodiment, the present invention provides a compound according to Formula I, or a pharmaceutically acceptable salt thereof, for use in therapy.

In another embodiment, the present invention also provides a compound according to Formula I, or a pharmaceutically acceptable salt thereof, for use in the treatment of type II diabetes mellitus in a mammal.

In an embodiment, the present invention provides the use of a compound according to Formula I, or a pharmaceutically acceptable salt thereof, for the manufacture of a medicament for the treatment of type II diabetes mellitus in a mammal.

The term "pharmaceutically acceptable salt" as used herein refers a salt of a compound of the invention considered to be acceptable for clinical and/or veterinary use. Examples of pharmaceutically acceptable salts and common methodologies for preparing them can be found in "Handbook of Pharmaceutical Salts: Properties, Selection and Use" P. Stahl, et al., 2nd Revised Edition, Wiley-VCH, 2011 and S. M. Berge, et al., "Pharmaceutical Salts", *Journal of Pharmaceutical Sciences,* 1977, 66(1), 1-19.

Examples of pharmaceutical compositions and processes for their preparation can be found in "Remington: The Science and Practice of Pharmacy", Loyd, V., et al. Eds., 22$^{nd}$ Ed., Mack Publishing Co., 2012. In one embodiment, the pharmaceutically compositions can be formulated for oral administration. Preferably the pharmaceutical compositions are formulated as a tablet, capsule, or a solution. The tablet, capsule, or solution can include a compound of the present invention in an amount effective for treating a patient in need of treatment.

The term "effective amount" refers to the amount or dose of a compound of the invention, or a pharmaceutically acceptable salt thereof, which, upon single or multiple dose administration to the patient, provides the desired effect in the patient under diagnosis or treatment. The attending physician, as one skilled in the art, can readily determine an effective amount by the use of conventional techniques and by observing results obtained under analogous circumstances. Factors considered in the determination of an effective amount or dose of a compound include: whether the compound or its salt will be administered; the co-administration of other agents, if used; the species of mammal; its size, age, and general health; the degree of involvement or the severity of the disorder; the response of the individual mammal; the mode of administration; the bioavailability characteristics of the preparation administered; the dose regimen selected; and other relevant circumstances. The compounds of the present invention are effective at a dosage per day that falls within the range of about 0.01 to about 15 mg/kg of body weight.

As used herein, the terms "treating", "to treat", or "treatment", refers to lowering, reducing, or reversing the progression or severity of an existing symptom, disorder, or condition, such as hyperglycemia, which can include increasing insulin secretion.

As used herein, the term "patient" refers to a mammal. Preferably, the patient is human.

The compounds of the present invention can be formulated as pharmaceutical compositions administered by any route which makes the compound bioavailable. Preferably, such compositions are for oral administration. Such pharmaceutical compositions and processes for preparing same are well known in the art (See, e.g., Remington, J. P., "Remington: The Science and Practice of Pharmacy", L. V. Allen, Editor, 22nd Edition, Pharmaceutical Press, 2012).

The compounds of Formula I and the pharmaceutically acceptable salts thereof are useful in the therapeutic uses of the invention, with certain configurations being preferred.

Although an embodiment contemplates all individual enantiomers, mixtures thereof, and racemates, compounds of Formula Ic, or pharmaceutically acceptable salts thereof, are particularly preferred. In an embodiment, compounds of Formula Ib, or pharmaceutically acceptable salts thereof, are particularly preferred. In an embodiment compounds of Formula Ia, or pharmaceutically acceptable salts thereof, are particularly preferred.

Individual enantiomers may be separated or resolved by one of ordinary skill in the art at any convenient point in the synthesis of compounds of the invention, by methods such as selective crystallization techniques, chiral chromatography (See for example, J. Jacques, et al., "*Enantiomers, Racemates, and Resolutions*", John Wiley and Sons, Inc., 1981, and E. L. Eliel and S. H. Wilen, "*Stereochemistry of Organic Compounds*", Wiley-Interscience, 1994), or supercritical fluid chromatography (SFC) (See for example, T. A. Berger; "*Supercritical Fluid Chromatography Primer*," Agilent Technologies, July 2015).

A pharmaceutically acceptable salt of the compounds of the invention can be formed, for example, by reaction of an appropriate neutral form of a compound of the invention and an appropriate pharmaceutically acceptable acid or base in a suitable solvent under standard conditions well known in the art (See, for example, Bastin, R. J., et al.; *Org. Process. Res. Dev.*, 4, 427-435, 2000 and Berge, S. M., et al.; *J. Pharm. Sci.*, 66, 1-19, 1977).

Certain abbreviations used herein are defined according to Daub G. H., et al., "The Use of Acronyms in Organic Chemistry" *Aldrichimica Acta*, 1984, 17(1), 6-23. Certain abbreviations are defined as follows: "ACN" refers to acetonitrile; "ATP" refers to adenosine triphosphate; "BOC" refers to tert-butoxycarbonyl; "BSA" refers to Bovine Serum Albumin; "cAMP" refers to cyclic adenosine-3',5'-monophosphate; "DCM" refers to dichloromethane or methylene chloride; "DIPEA" refers to N,N-diisopropylethylamine; "DMF" refers to N,N-dimethylformamide; "DMSO" refers to dimethylsulfoxide; "$EC_{50}$" refers to the concentration of an agent which produces 50% response of the target activity compared to a predefined positive control compound (absolute $EC_{50}$); "ES/MS" refers to electrospray mass spectrometry; "EtOAc" refers to ethyl acetate; "HATU" refers to 1-[bis(dimethylamino)methylene]-1H-1,2,3-triazolo[4,5-b]pyridinium 3-oxid hexafluorophosphate; "HEK" refers to human embryonic kidney; "HEPES" refers to 4-(2-hydroxyethyl)-1-piperazineethanesulfonic acid; "h" refers to hours or hour, respectively; "MeOH" refers to methanol or methyl alcohol; "min" refers to minute or minutes; "MTBE" refers to methyl tert-butyl ether; "Pd(dppf)$Cl_2$·DCM" refers to 1,1'-bis(diphenylphosphino)ferrocene-palladium(II) dichloride dichloromethane complex; "RT" refers to room temperature; "SCX" refers to strong cation exchange; "SFC" refers to supercritical fluid chromatography; and "THF" refers to tetrahydrofuran.

The compounds of the present invention may be prepared by a variety of procedures, some of which are illustrated in the Preparations and Examples below. The product of each step below can be recovered by conventional methods, including extraction, evaporation, precipitation, chromatography, filtration, trituration, and crystallization. Individual isomers, enantiomers, and diastereomers may be separated or resolved at any convenient point in the synthesis, by methods such as, selective crystallization techniques or chiral chromatography (See for example, J. Jacques, et al., "*Enantiomers, Racemates, and Resolutions*", John Wiley and Sons, Inc., 1981, and E. L. Eliel and S. H. Wilen, "*Stereochemistry of Organic Compounds*", Wiley-Interscience, 1994). Without limiting the scope of the invention, the following preparations, and examples are provided to further illustrate the invention.

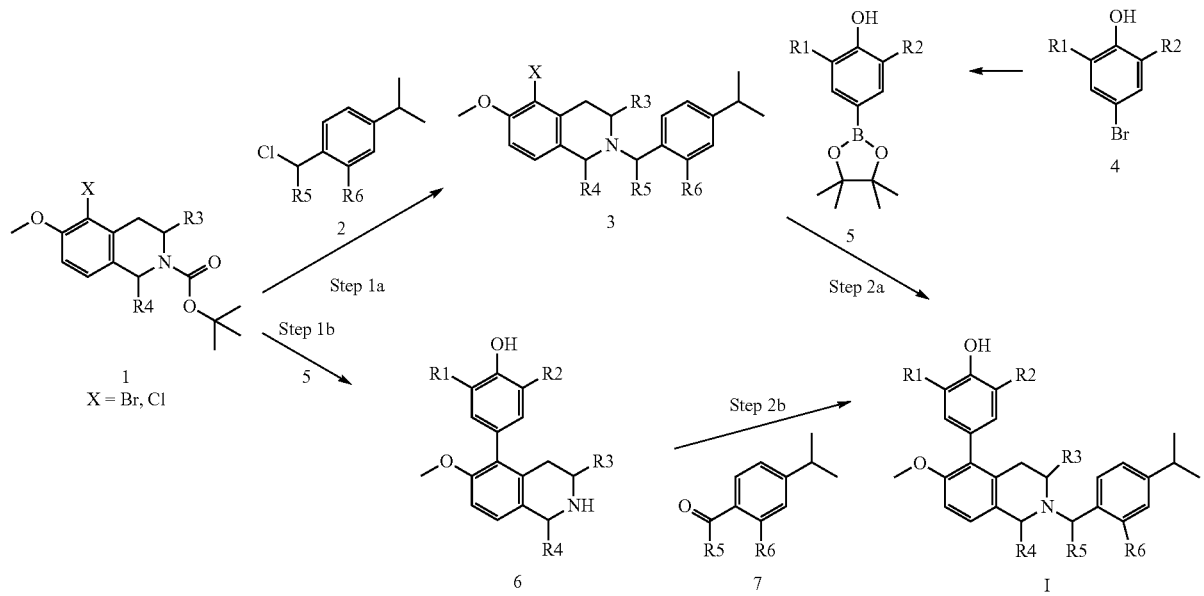

Scheme 1

Scheme 1 shows the synthesis of the compounds of Formula I via two routes. In the first route, in Step 1a key intermediate 1 is deprotected using HCl in an organic solvent, followed by alkylation with alkyl chloride 2 in the presence of KI and an organic base at elevated temperature to give intermediate 3. In Step 2a, intermediate 3 then undergoes a one-pot Miyaura borylation/Suzuki coupling: using bis(pinacolato)diboron, Pd(dppf)$Cl_2$·DCM, and potassium acetate at elevated temperature, aryl halide 4 is converted to boronic ester 5, whereupon intermediate 3 and aqueous potassium phosphate tribasic are added to the reaction giving a compound of Formula I. Alternatively, boronate 5 is prepared from aryl halide 4 in a separate step under similar Miyaura borylation conditions, and then in Step 2a it undergoes Suzuki coupling with intermediate 3 to give a compound of Formula I.

In the second route, in Step 1b intermediate 1 undergoes Suzuki coupling with boronate 5 using $2^{nd}$ generation XPhos precatalyst and aqueous potassium phosphate tribasic in 2-methyl-2-butanol at elevated temperature, which also removes the BOC protecting group, giving amine intermediate 6. Reductive amination with intermediate 6 and carbonyl intermediate 7 with sodium triacetoxyborohydride in Step 2b gives a compound of Formula I.

LC-ES/MS is performed on an AGILENT® HP1200 liquid chromatography system. Electrospray mass spectrometry measurements (acquired in positive and/or negative mode) are performed on a Mass Selective Detector quadrupole mass spectrometer interfaced to an HPLC which may or may not have an ELSD. LC-ES/MS conditions (low pH): column: PHENOMENEX® GEMINI® NX C18 2.0×50 mm 3.0 mm, 110 Å; gradient: 5-95% B in 1.5 min, then 95% B for 0.5 min column temperature: 50° C.+/−10° C.; flow rate: 1.2 mL/min; 1 mL injection volume; Solvent A: deionized water with 0.1% HCOOH; Solvent B: ACN with 0.1% formic acid; wavelength 200-400 nm and 212-216 nm. If the HPLC is equipped with an ELSD the settings are 45° C. evaporator temperature, 40° C. nebulizer temperature, and 1.6 SLM gas flow rate. Alternate LC-MS conditions (high pH): column: Waters xBridge® C18 column 2.1×50 mm, 3.5 mm; gradient: 5-95% B in 1.5 min, then 95% B for 0.50 min; column temperature: 50° C.+/−10° C.; flow rate: 1.2 mL/min; 1 µL injection volume; Solvent A: 10 mM $NH_4HCO_3$ pH 9; Solvent B: ACN; wavelength: 200-400 nm and 212-216 nm; if had ELSD: 45° C. evaporator temp, 40° C. nebulizer temp, and 1.60 SLM gas flow rate.

Preparation 1

N-[2-(3-Methoxyphenyl)ethyl]acetamide

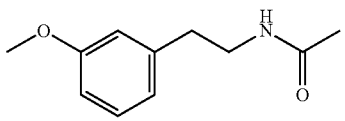

Dissolve 3-methoxyphenethylamine (48 g, 308 mmol) in DCM (384 mL), add triethylamine (64.4 mL, 462 mmol) and cool to 0-5° C. Add acetyl chloride (24.1 mL, 339 mmol) dropwise and stir at ambient temperature for 1 h. Add water and separate the layers. Wash the organic layer with 0.5 M HCl and saturated $NaHCO_3$, dry over $MgSO_4$, filter and concentrate in-vacuo to obtain the title compound (59 g, 99%) as a yellow oil. ES/MS m/z: 194 $[M+H]^+$.

Preparation 2

6-Methoxy-1-methyl-3,4-dihydroisoquinoline

Dissolve N-[2-(3-methoxyphenyl)ethyl]acetamide (5 g, 26 mmol) in ACN (74 mL). Add phosphoryl chloride (2.9 mL, 31.0 mmol) and heat the reaction at 75° C. for 3 h. Cool the mixture to ambient temperature, pour into aqueous $K_3PO_4$ (2 M, 200 mL) and stir for 30 min. Extract twice with EtOAc. Combine the organic layers and wash with saturated aqueous NaCl, dry over $MgSO_4$, filter and concentrate in-vacuo to obtain the title compound (4.6 g, 91%) as a brown oil. ES/MS m/z: 176 $[M+H]^+$.

Preparation 3 tert-Butyl (1R)-6-methoxy-1-methyl-3,4-dihydro-1H-isoquinoline-2-carboxylate

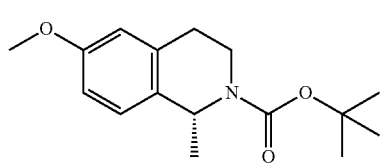 [SMILES: COc1ccc2c(c1)CCN(C(=O)OC(C)(C)C)[C@@H]2C]

Dissolve 6-methoxy-1-methyl-3,4-dihydroisoquinoline (4.6 g, 26 mmol) in ACN (90 mL). Add formic acid/triethylamine 5:2 complex (17 mL, 40 mmol) followed by (S,S)—N-(p-toluenesulfonyl)-1,2-diphenylethanediamine (chloro)(p-cymene)ruthenium (II) (86 mg, 0.13 mmol). Stir at ambient temperature for 17 h under a gentle nitrogen flow. Dilute with EtOAc, wash twice with aqueous $K_2CO_3$ (3 M) and saturated aqueous NaCl. Dry the organics over $Na_2SO_4$, filter and concentrate in-vacuo. Stir the crude material in water (2 mL). Add di-tert-butyl dicarbonate (0.2 g, 0.9 mmol) in water (2 mL) and stir vigorously for 2.5 h. Add aqueous $KHSO_4$ (1 M solution, 20 mL), stir for 2 minutes and separate the layers. Wash the organic layer with aqueous $K_2CO_3$ (3 M) and saturated aqueous NaCl. Dry the organics over $MgSO_4$, filter and concentrate in-vacuo. Dissolve the crude product in DCM and concentrate onto Celite®, then purify by silica gel chromatography using a gradient of 0 to 50% EtOAc in hexanes to obtain the title compound (6.26 g, 82%) as a colourless oil. ES/MS m/z: 222 $[M+H-t-Bu]^+$.

Preparation 4 tert-Butyl (1R)-5-bromo-6-methoxy-1-methyl-3,4-dihydro-1H-isoquinoline-2-carboxylate

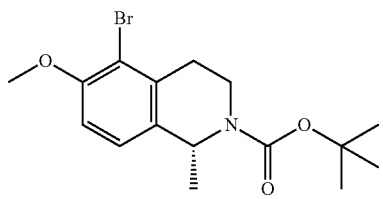 [SMILES: COc1ccc2c(c1Br)CCN(C(=O)OC(C)(C)C)[C@@H]2C]

Dissolve tert-butyl (1R)-6-methoxy-1-methyl-3,4-dihydro-1H-isoquinoline-2-carboxylate (60 g, 216 mmol) and sodium acetate (17.4 mL, 324 mmol) in acetic acid (300 mL) and stir for 30 min. Add N-bromosuccinimide (42.3 g, 238 mmol) and stir at ambient temperature for 1 h. Add water and extract twice with hexane. Combine the organic layers and wash with saturated aqueous $NaHCO_3$. Dry the organics over $MgSO_4$, filter and concentrate in-vacuo. Purify the crude product by flash chromatography eluting with a gradient of 10 to 15% EtOAc in hexane. Triturate the purified material with hexane (40 mL) and stir overnight. Filter the solid to obtain the title compound (21.5 g, 28%) as a white solid, 98% ee by analytical chiral SFC (column: Chiralpak® AD 10×46 cm, 5 µm; mobile phase: isocratic 1:9 (isopropanol+0.2% isopropanamine):$CO_2$; flow rate: 5 mL/min; column temperature: 40° C.; outlet pressure: 150 bar; retention times: 0.79 min (desired isomer), 0.97 min). ES/MS m/z: 300, 302 $[M+H]^+$.

Preparation 5

(1R)-5-Bromo-6-methoxy-1-methyl-1,2,3,4-tetrahydroisoquinoline; hydrochloride

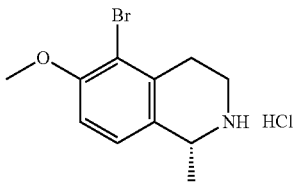

Dissolve tert-butyl (1R)-5-bromo-6-methoxy-1-methyl-3,4-dihydro-1H-isoquinoline-2-carboxylate (7.4 g, 21 mmol) in DCM (100 mL) and add hydrogen chloride (4 M in 1,4-dioxane, 26 mL, 104 mmol). Stir at ambient temperature for 17 h. Filter and wash the solid with EtOAc. Dry the solid under high vacuum to obtain the title compound (5.93 g, 95%) as a white solid. ES/MS m/z: 256, 258 [M+H]$^+$.

Preparation 6

(1R)-5-Bromo-2-[1-(4-isopropylphenyl)ethyl]-6-methoxy-1-methyl-3,4-dihydro-1H-isoquinoline (Isomer 1 and Isomer 2)

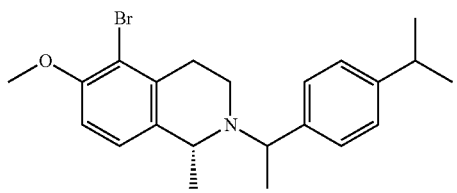 [SMILES: COc1ccc2c(c1Br)CCN(C(C)c1ccc(C(C)C)cc1)[C@@H]2C]

Dissolve racemic 1-(1-chloroethyl)-4-isopropyl-benzene (2 g, 8.76 mmol), N,N-diisopropylethylamine (2 mL, 11.5 mmol) and potassium iodide (1.3 g, 7.8 mmol) in anhydrous N,N-dimethylacetamide (100 mL) in a resealable tube and stir at ambient temperature for 10 min. Add (1R)-5-bromo-6-methoxy-1-methyl-1,2,3,4-tetrahydroisoquinoline; hydrochloride (2 g, 6.83 mmol) in one portion. Cap the vial and stir at 60° C. for 96 h. Cool to ambient temperature and partitioned between water/saturated NaHCO$_3$ (1:1) and EtOAc. Extract the aqueous layer twice with EtOAc. Combine the organic layers, wash with water and saturated aqueous NaCl, dry over Na$_2$SO$_4$, filter and concentrate in-vacuo. Purify the crude material by flash chromatography on silica gel eluting with 17% EtOAc in DCM to obtain a mixture of diastereomers of the title compound (2 g, 67%) as a pale brown solid. ES/MS m/z: 402, 404 [M+H]$^+$.

Combine the diastereomeric mixture with another lot of the diastereomeric mixture prepared as above (1.5 g). Dissolve the mixture of diastereomers (3.5 g, 8.2 mmol) in 4:1 MeOH/DCM (100 mL). Separate the mixture by chiral SFC (column: Chiralpak® IG (25×2 cm, 5 µm); mobile phase: isocratic 10% (ethanol with 0.2% dimethylethylamine) in CO$_2$; temperature: 40° C.; flow rate: 65 g/min; outlet pressure: 120 bar) to obtain Isomer 1 (first-eluting, 1.08 g, 33%) and Isomer 2 (second-eluting, 0.91, 28%) as white solids.

Analytical chiral SFC (column: Chiralpak IG® (10 cm×4.6 mm, 5 µm); mobile phase: 5 to 25% (ethanol with 0.2% isopropanamine) in CO$_2$; temperature: 40° C.; flow rate: 4 mL/min; outlet pressure: 120 bar) shows Isomer 1 (retention time 1.4 min) is 95% de and Isomer 2 (retention time of 1.6 min) is >98% de.

Preparation 7

4-Bromo-2-fluoro-6-(isobutylamino)phenol

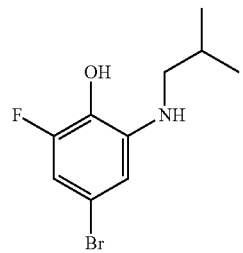

Dissolve 2-amino-4-bromo-6-fluorophenol (700 mg, 3.40 mmol) and 2-methylpropanal (0.5 mL, 5 mmol) in THF (5.7 mL). Add acetic acid (3.4 mL, 59 mmol) and methanol (34 mL) and stir at 0° C. for 2 min. Add 2-methylpyridine borane complex (640 mg, 5.08 mmol) and stir at 60° C. for 17 h. Remove the solvents under reduced pressure and purify the residue on a SCX column, eluting the compound with a solution of NH$_3$ in MeOH (2 M). Repurify the material by silica gel chromatography using a gradient of 0 to 30% EtOAc in hexanes to obtain the title compound (380 mg, 43%) as a sticky oil. ES/MS m/z: 260, 262 [M−H]$^+$.

EXAMPLE 1

2-Fluoro-6-(isobutylamino)-4-[(1R)-2-[1-(4-isopropylphenyl)ethyl]-6-methoxy-1-methyl-3,4-dihydro-1H-isoquinolin-5-yl]phenol; dihydrochloride Mix 4-bromo-2-fluoro-6-(isobutylamino)phenol (200 mg, 0.76 mmol) and anhydrous 1,4-dioxane (2 mL). Bubble nitrogen through the mixture for 15 min and add bis(pinacolato)diboron (240 mg, 0.9263 mmol), Pd(dppf)Cl$_2$·DCM (32 mg, 0.038 mmol) and potassium acetate (116 mg, 1.15 mmol). Bubble nitrogen through the mixture for 5 min, seal the reaction vessel and stir at 90° C. for 17 h. Cool the mixture to ambient temperature and add (1R)-5-bromo-2-[1-(4-isopropylphenyl)ethyl]-6-methoxy-1-methyl-3,4-dihydro-1H-isoquinoline, Isomer 2 (210 mg, 0.52 mmol), (2-dicyclohexylphosphino-2',4',6'-triisopropyl-1,1'biphenyl) [2-(2'-amino-1,1'-biphenyl)]palladium(II) methanesulfonate (23 mg, 0.026 mmol) and potassium phosphate tribasic (1M in water, 1.5 mL, 1.5 mmol). Seal the reaction vessel and stir the mixture at 90° C. for 4 h. Cool the reaction mixture to ambient temperature and add EtOAc. Wash the organics with a 5% aqueous citric acid, dry over $Na_2SO_4$, filter and concentrate in-vacuo. Purify the residue on a SCX column eluting with 2N $NH_3$ in MeOH. Further purify the product by silica gel chromatography using a gradient of 0 to 30% EtOAc in DCM. Purify the product again by silica gel chromatography using a gradient of 0 to 40% EtOAc in hexanes. Further purify the product by SFC (column: Luna® HILIC (30×150 mm, 5 μm); gradient 10% to 20% of (10 mM $NH_4HCO_3$ in MeOH, pH 8) in $CO_2$) to obtain the free base of the title compound (68 mg, 17%) as a white solid. ES/MS m/z: 505 [M+H]$^+$.

Dissolve the free base of the title compound (68 mg, 0.14 mmol) in ACN (3 mL) and add hydrogen chloride (2M in ether, 0.40 mL, 0.8 mmol). Stir for 2 min and remove solvent with a nitrogen stream at 40° C. Dry in-vacuo for 96 h to obtain the title compound (77 mg, 97%) as a dark brown solid. ES/MS m/z: 505 [M+H]$^+$.

Preparation 8

Diethyl 2-acetamido-2-[(2-chloro-3-methoxy-phenyl)methyl]propanedioate

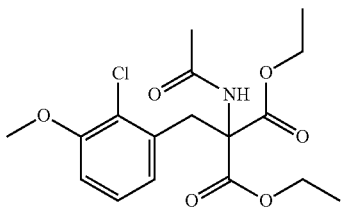 [SMILES: CCOC(=O)C(Cc1cccc(OC)c1Cl)(NC(C)=O)C(=O)OCC]

Mix 1-(bromomethyl)-2-chloro-3-methoxy-benzene (63.9 g, 271 mmol), diethyl acetamidomalonate (60.1 g, 271 mmol), potassium carbonate (75.0 g, 542 mmol) and potassium iodide (45.0 g, 271 mmol) in ACN (958 mL) and heat the mixture to reflux for 2 h under nitrogen. Add diethyl acetamidomalonate (6.6 g, 29.8 mmol) and reflux for further 36 h. Concentrate solvents to ⅓ of the volume and add water and EtOAc. Separate the organic layer and extract the aqueous layer twice with EtOAc. Combine organic layers, wash with water and saturated aqueous NaCl, dry over $Na_2SO_4$ and concentrate to obtain the title compound (105.7 g, 100%) as a white foam. ES/MS m/z: 372 [M+H]$^+$.

Preparation 9

5-Chloro-6-methoxy-1,2,3,4-tetrahydroisoquinoline-3-carboxylic acid; hydrochloride

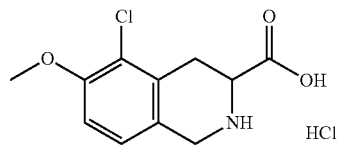 [SMILES: COc1ccc2c(c1Cl)CC(C(=O)O)NC2 ; Cl]

Mix diethyl 2-acetamido-2-[(2-chloro-3-methoxy-phenyl)methyl]propanedioate (105.6 g, 284 mmol), acetic acid (211 mL) and hydrochloric acid (37% in $H_2O$, 528 mL, 6400 mmol) and heat the mixture to reflux for 18 h under nitrogen. Cool the mixture to 50° C., add formaldehyde (37% in water, 284 mL, 3790 mmol) dropwise and stir at 100° C. for 2 h. Cool the mixture to 0° C. and stir for 30 min. Filter the resulting solid, wash with water and dry to obtain the title compound (68.8 g, 87%) as a white solid. ES/MS m/z: 242 [M+H]$^+$.

Preparation 10

Methyl 5-chloro-6-methoxy-1,2,3,4-tetrahydroisoquinoline-3-carboxylate (Isomer 1 and Isomer 2)

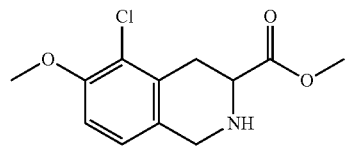

Suspend 5-chloro-6-methoxy-1,2,3,4-tetrahydroisoquinoline-3-carboxylic acid hydrochloride (60.5 g, 218 mmol) in methanol (860 mL) and stir at 5° C. under nitrogen. Add thionyl chloride (77.6 g, 653 mmol) dropwise and reflux the mixture for 20 h under nitrogen. Cool the mixture to ambient temperature and remove the solvents in-vacuo. Triturate the residue with EtOAc, then filter and wash the solid with EtOAc. Dry the solid under vacuum at 40° C. overnight to obtain the hydrochloride salt of the title compound (58.8 g, 92%) as a racemic mixture.

Suspend a portion of the solid (15.00 g, 49.80 mmol) in saturated aqueous $K_2CO_3$ (15 mL) and stir at ambient temperature for 30 min. Filter the solid and wash with water. Dry the white solid in-vacuo at 40° C. Dissolve the solid in DCM and filter through a silica plug using a gradient 0 to 5% MeOH in DCM to give the title compound (12.18 g) as a racemic mixture. ES/MS m/z 256 [M+H]$^+$.

Separate a portion of the racemic mixture (10.15 g) by chiral SFC (column: Chiralpak® IG (25×2 cm, 5 μm); mobile phase: 15% (MeOH+0.2% dimethylethylamine) in $CO_2$; temperature: ambient; flow rate: 80 g/min; outlet pressure: 120 bar) to obtain Isomer 1 (first-eluting, 2.69 g, 26%) and Isomer 2 (second-eluting, 4.10, 40%) of the title compound. Analytical chiral SFC (column: Chiralpak® IG (10 cm×4.6 mm, 5 μm); mobile phase: 15 to 55% (methanol+0.2% isopropanamine) in $CO_2$; temperature: 40° C.; flow rate: 4 mL/min; outlet pressure: 120 bar) shows both Isomer 1 (retention time: 1.58 min) is >98% ee and Isomer 2 (retention time: 1.66 min) is 95% ee.

Preparation 11

O2-tert-Butyl O3-methyl 5-chloro-6-methoxy-3,4-dihydro-1H-isoquinoline-2,3-dicarboxylate

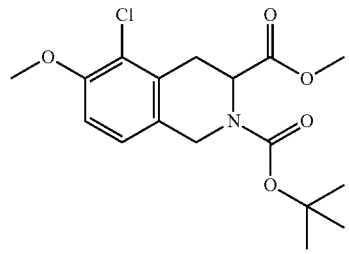 [SMILES: COC(=O)C1Cc2c(ccc(OC)c2Cl)CN1C(=O)OC(C)(C)C]

Add di-tert-butyl dicarbonate (3.5 g, 16 mmol) to a solution of methyl 5-chloro-6-methoxy-1,2,3,4-tetrahydroisoquinoline-3-carboxylate (Isomer 1, 3.6 g, 14 mmol) in DCM (70 mL) and stir at ambient temperature for 4 h. Remove the solvent under reduced pressure and purify the residue by silica gel chromatography using a gradient of 0 to 20% EtOAc in DCM. Wash the solid with hexane and filter to obtain the title compound (4.55 g, 90%) as a white solid. ES/MS m/z: 256 [M+H−BOC]+.

Preparation 12 tert-Butyl 5-chloro-3-(hydroxymethyl)-6-methoxy-3,4-dihydro-1H-isoquinoline-2-carboxylate

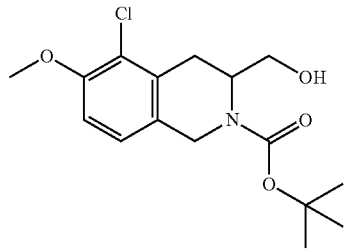 [SMILES: COc1ccc2c(c1Cl)CC(CO)N(C(=O)OC(C)(C)C)C2]

Add lithium borohydride (2.0 M in THF, 13 mL, 26 mmol) to a solution of O2-tert-butyl O3-methyl 5-chloro-6-methoxy-3,4-dihydro-1H-isoquinoline-2,3-dicarboxylate (4.55 g, 12.8 mmol) in anhydrous THF (40 mL) at ambient temperature and stir for 6 h. Add water and stir the mixture at ambient temperature for 10 min. Dilute with water and extract twice with EtOAc. Combine the organic layers and wash with water, saturated aqueous NaHCO$_3$ and saturated aqueous NaCl. Dry the organics over anhydrous Na$_2$SO$_4$, filter and concentrate in-vacuo. Dry the residue in-vacuo at ambient temperature for 17 h to obtain the title compound (4.4 g, 100%) as a waxy solid. ES/MS m/z: 272 [M+H−Boc]+.

Preparation 13 tert-Butyl 5-chloro-6-methoxy-3-(methoxymethyl)-3,4-dihydro-1H-isoquinoline-2-carboxylate

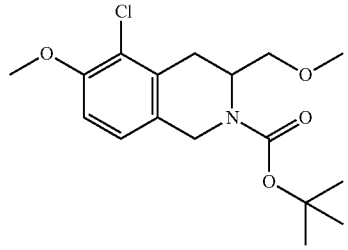

Add sodium hydride (60% in oil, 2.1 mg, 0.053 mmol) to a 0° C. solution of tert-butyl 5-chloro-3-(hydroxymethyl)-6-methoxy-3,4-dihydro-1H-isoquinoline-2-carboxylate (4.4 g, 13 mmol) and iodomethane (8.1 mL, 130 mmol) in anhydrous DMF (87 mL) and stir the reaction for 10 min. Add water dropwise until no gas evolution is observed and partition the mixture between water and ethyl acetate. Wash the organic layer with water and saturated aqueous NaCl, dry over anhydrous Na$_2$SO$_4$, filter and concentrate in-vacuo. Purify the residue by silica gel chromatography using a gradient of 0 to 10% EtOAc in DCM to obtain the title compound (4.5 g, 94%) as a waxy solid. ES/MS m/z: 242 [M+H−t-Bu]+.

Preparation 14

4-[6-Methoxy-3-(methoxymethyl)-1,2,3,4-tetrahydroisoquinolin-5-yl]-2-methyl-phenol;hydrochloride

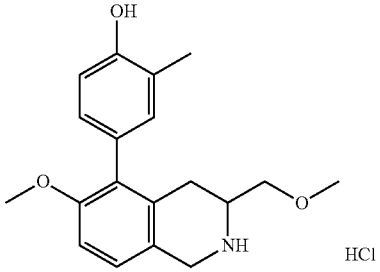

Dissolve tert-butyl 5-chloro-6-methoxy-3-(methoxymethyl)-3,4-dihydro-1H-isoquinoline-2-carboxylate (2.68 g, 7.84 mmol) and 2-methyl-4-(4,4,5,5-tetramethyl-1,3,2-dioxaborolan-2-yl)phenol (2.45 g, 9.42 mmol) in 2-methyl-2-butanol (54 mL) in a resealable tube and purge with a nitrogen stream for 30 min while stirring. Add chloro(2-dicyclohexylphosphino-2',4',6'-triisopropyl-1,11-biphenyl)[2-(2'-amino-1,1'-biphenyl)]palladium(II) (2$^{nd}$ generation XPhos precatalyst, 325 mg, 0.39 mmol) and potassium phosphate tribasic (1M in water, 16 mL, 16 mmol), seal the vessel and heat the mixture at 85° C. for 2 h. Allow the mixture to cool to ambient temperature, filter through Celite® and rinse with EtOAc. Wash the organic layer with water and saturated aqueous NaCl, dry over anhydrous Na$_2$SO$_4$, filter and concentrate in-vacuo. Purify by silica gel chromatography using a gradient of 0 to 10% EtOAc in DCM. Dissolve the material in DCM (30 mL), add hydrogen chloride (4M in 1,4-dioxane, 10 mL, 40 mmol) and stir the mixture at ambient temperature for 1.5 h. Remove the solvents, then triturate the solid with EtOAc and filter. Wash the solid with EtOAc to obtain the title compound (2.6 g, 91%) as a white solid. ES/MS m/z: 314 [M+H]+.

EXAMPLE 2

4-[2-[(2-Hydroxy-4-isopropyl-phenyl)methyl]-6-methoxy-3-(methoxymethyl)-3,4-dihydro-1H-isoquinolin-5-yl]-2-methyl-phenol; hydrochloride

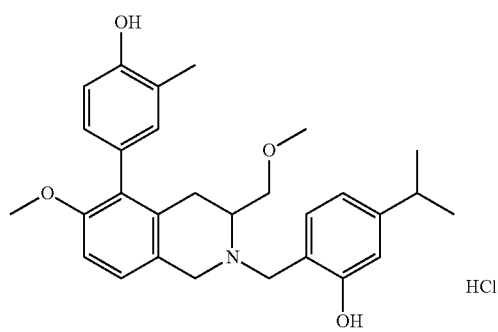 [SMILES: COCC1Cc2c(ccc(OC)c2-c2ccc(O)c(C)c2)CN1Cc1ccc(C(C)C)cc1O ; Cl]

Suspend 4-[6-methoxy-3-(methoxymethyl)-1,2,3,4-tetrahydroisoquinolin-5-yl]-2-methyl-phenol; hydrochloride (157 mg, 0.45 mmol) in DCM (3 mL) and add 4-isopropylsalicylaldehyde (0.11 mL, 0.71 mmol) and triethylamine (0.19 mL, 1.35 mmol). After 20 min add sodium triacetoxyborohydride (294 mg, 1.35 mmol) and stir the mixture at ambient temperature for 16 h. Add 4-isopropylsalicylaldehyde (0.060 mL, 0.39 mmol) and sodium triacetoxyborohydride (151 mg, 0.69 mmol) and stir the mixture for 6 h. Dilute the mixture with DCM and wash with saturated aqueous NH$_4$Cl. Extract the aqueous layer with DCM. Combine the organic layers, dry over Na$_2$SO$_4$, filter and concentrate in-vacuo. Purify the residue by silica gel chromatography using a gradient of 0 to 25% EtOAc in DCM. Further purify by chromatography in silica gel eluting with hexane/EtOAc 3:1 followed by 2:1. Load onto a SCX column and elute the compound with 2N NH$_3$ in MeOH. Dissolve the compound in DCM (1 mL) and add hydrogen chloride (2M in ether, 0.50 mL, 1.0 mmol). Concentrate to dryness and dry under high vacuum at 40° C. for 48 h to obtain the title compound (138 mg, 73%) as a white solid. ES/MS m/z: 462 [M+H]$^+$.

Preparation 15

2-Fluoro-6-methyl-4-(4,4,5,5-tetramethyl-1,3,2-dioxaborolan-2-yl)phenol

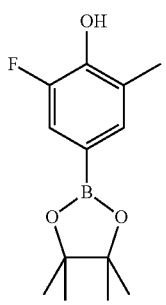 [SMILES: Cc1cc(B2OC(C)(C)C(C)(C)O2)cc(F)c1O]

Dissolve 4-bromo-2-fluoro-6-methyl-phenol (24 g, 94 mmol), bis(pinacolato)diboron (28 g, 110 mmol) and potassium acetate (13 g, 130 mmol) in degassed anhydrous 1,4-dioxane (200 mL). Add Pd(dppf)Cl$_2$·DCM (5 g, 6.0 mmol). Bubble nitrogen through the mixture for 5 min and stir at 85° C. for 2 h. Dilute the reaction mixture with DCM and filter through Celite®. Concentrate the mixture in-vacuo and dilute with EtOAc and water. Separate the layers and wash the organic layer with water, dry over anhydrous MgSO$_4$, filter and concentrate in-vacuo. Purify the residue by silica gel chromatography using a gradient of 0 to 10% MTBE in hexanes to obtain the title compound (14.5 g, 61%) as a white solid. ES/MS m/z: 251 [M−H]$^+$.

EXAMPLE 3

2-Fluoro-4-[(1R)-2-[1-(4-isopropylphenyl)ethyl]-6-methoxy-1-methyl-3,4-dihydro-1H-isoquinolin-5-yl]-6-methyl-phenol; hydrochloride

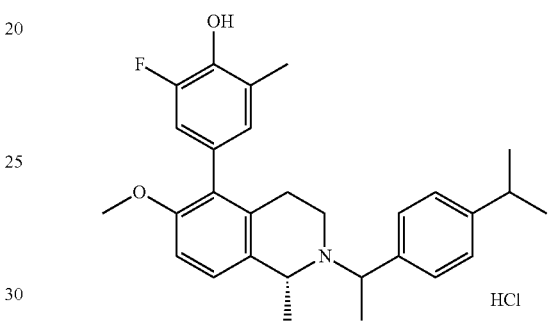

Bubble nitrogen for 5 min through a mixture of (1R)-5-bromo-2-[1-(4-isopropylphenyl)ethyl]-6-methoxy-1-methyl-3,4-dihydro-1H-isoquinoline (Isomer 2, 31 mg, 0.077 mmol), 2-fluoro-6-methyl-4-(4,4,5,5-tetramethyl-1,3,2-dioxaborolan-2-yl)phenol (30 mg, 0.12 mmol), potassium phosphate tribasic (1 M aqueous solution, 0.17 mL, 0.17 mmol), and 2-methyl-2-butanol. Add (2-dicyclohexylphosphino-2',4',6'-triisopropyl-1-1'-biphenyl)[2-(2'-amino-1,1'-biphenyl)]palladium(II) methanesulfonate (XPhos Pd G3, 4 mg, 0.5 µmol) and heat the mixture to 100° C. for 3 h. Cool the mixture to room temperature and pour onto a SCX column. Elute the column with MeOH and then NH$_3$ in MeOH (2 M). Remove the solvent from the NH$_3$/MeOH elution in-vacuo. Purify the residue by silica gel chromatography using a gradient of 7 to 30% EtOAc in hexanes to obtain the free base of the title compound (28 mg), then add ACN and add hydrogen chloride (2M in diethylether, 0.20 mL, 0.31 mmol). Remove solvents with a nitrogen stream and dry the material at 40° C. under high vacuum overnight to obtain the title compound (26 mg, 85%) as a white solid. ES/MS m/z: 448 [M+H]$^+$.

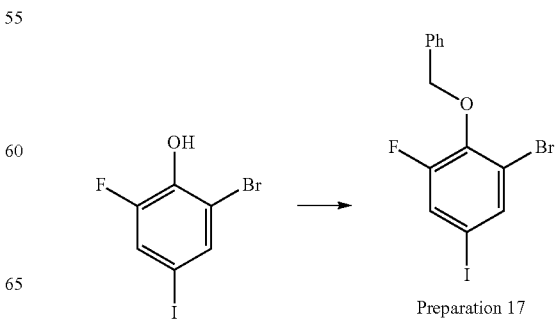

Preparation 17

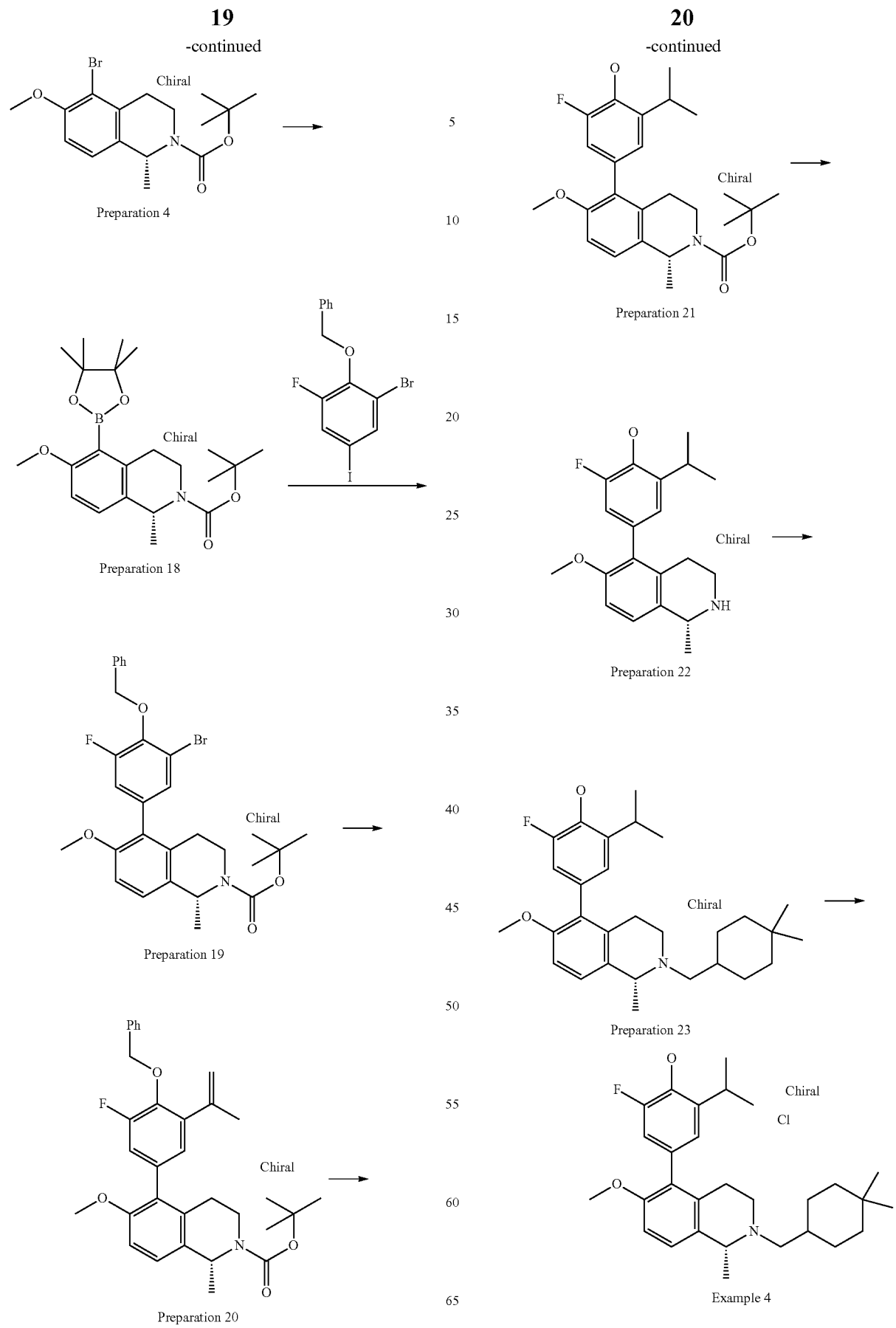

Preparation 17

2-Benzyloxy-1-bromo-3-fluoro-5-iodo-benzene

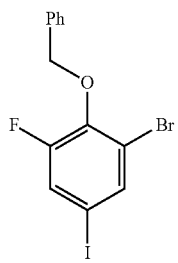

Dissolve 2-bromo-6-fluoro-4-iodo-phenol (3.66 g, 11.5 mmol) and potassium carbonate (3.2 g, 23 mmol) in DMF (23 mL) and stir at rt for 5 min. Add benzyl bromide (2.1 mL, 18 mmol) by syringe and stir at rt for 2 hours. Add AcOEt and water, separate layers and wash the organic layer with water, dry over MgSO$_4$, filter and concentrate in-vacuo to obtain a brown oil. Purify by flash chromatography eluting with a gradient of 0-20% of DCM in hexane to obtain the title compound (4.53 g, 96% yield) as a white solid.

Preparation 18 tert-Butyl (1R)-6-methoxy-1-methyl-5-(4,4,5,5-tetramethyl-1,3,2-dioxaborolan-2-yl)-3,4-dihydro-1H-isoquinoline-2-carboxylate

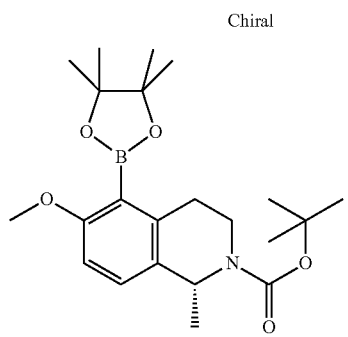 [SMILES: COc1ccc2c(c1B1OC(C)(C)C(C)(C)O1)CCN(C(=O)OC(C)(C)C)[C@@H]2C]

Combine preparation 4 (1000 mg, 2.81 mmol), 4,4,5,5-tetramethyl-2-(4,4,5,5-tetramethyl-1,3,2-dioxaborolan-2-yl)-1,3,2-dioxaborolane (1000 mg, 3.94 mmol) and potassium acetate (520 mg, 5.30 mmol) in degassed 1,4-dioxane (20 mL) in a microwave tube. Add tris(benzylideneacetone)dipalladium(0) (160 mg, 0.17 mmol) and tricyclohexylphosphine (120 mg, 0.42 mmol). Degass the mixture for 5 minutes, cap and heat in a microwave at 150° C. for 1 hour. Purify by flash chromatography eluting with a gradient of 0-20% of methyl tert-butyl ether in hexane to obtain the title compound as a yellow oil (942 mg, 75% yield). MS(ESI) m/z: 304 [M+H−(t-Bu)]$^+$.

Preparation 19 tert-Butyl (1R)-5-(4-benzyloxy-3-bromo-5-fluorophenyl)-6-methoxy-1-methyl-3,4-dihydro-1H-isoquinoline-2-carboxylate

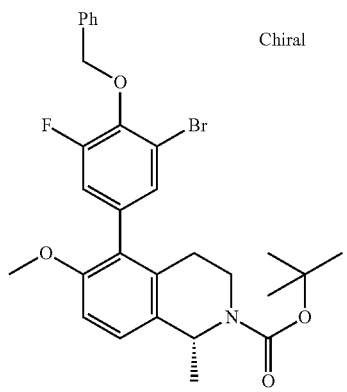 [SMILES: COc1ccc2c(c1-c1cc(F)c(OCc3ccccc3)c(Br)c1)CCN(C(=O)OC(C)(C)C)[C@@H]2C]

Dissolve tert-butyl (1R)-6-methoxy-1-methyl-5-(4,4,5,5-tetramethyl-1,3,2-dioxaborolan-2-yl)-3,4-dihydro-1H-isoquinoline-2-carboxylate (3380 mg, 8.38 mmol), 2-benzyloxy-1-bromo-3-fluoro-5-iodo-benzene (4100 mg, 10.07 mmol), sodium carbonate (2.7 g, 25.0 mmol) in 1,4-dioxane (67 mL) and water (17 mL) in a resealable tube. Bubble nitrogen through the solution for 5 minutes and add tetrakis(triphenylphosphine)palladium(0) (500 mg, 0.43 mmol). Cap the tube and stirr at 90° C. for 5 h. Concentrate, adsorbed on Celite® and purify by flash chromatography eluting with a gradient of 0-30% of methyl tert-butyl ether in hexane to obtain the title compound as a white solid (3.07 g, 90% yield).

MS(ESI) m/z: 502 [M+H−(t-Bu)]$^+$.

Preparation 20 tert-Butyl (1R)-5-(4-benzyloxy-3-fluoro-5-isopropenyl-phenyl)-6-methoxy-1-methyl-3,4-dihydro-1H-isoquinoline-2-carboxylate

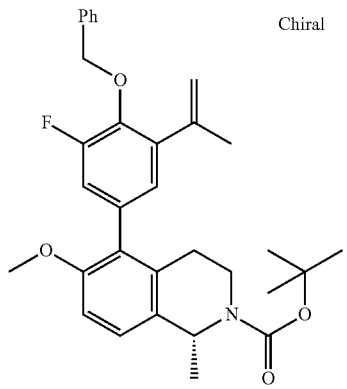 [SMILES: C=C(C)c1cc(-c2c(OC)ccc3c2CCN(C(=O)OC(C)(C)C)[C@@H]3C)cc(F)c1OCc1ccccc1]

Dissolve tert-butyl (1R)-5-(4-benzyloxy-3-bromo-5-fluoro-phenyl)-6-methoxy-1-methyl-3,4-dihydro-1H-isoquinoline-2-carboxylate (150 mg, 0.27 mmol), 2-isopropenyl-4,4,5,5-tetramethyl-1,3,2-dioxaborolane (100 mg, 0.59 mmol), sodium carbonate (85 mg, 0.80 mmol) in 1,4-dioxane (4 mL) and water (0.27 mL) in a resealable tube. Bubble nitrogen for 5 minutes and add tetrakis(triphenylphosphine)palladium(0)) (17 mg, 0.015 mmol), cap and stir at 90° C. for 18 h. Concentrate and adsorbed on Celite®, and purify by flash chromatography eluting with a gradient of 20-60% of methyl tert-butyl ether in hexane to obtain the title compound as a colorless oil (200 mg, 49% yield). MS(ESI) m/z: 418 [M+H−Boc]+.

Preparation 21 tert-Butyl (1R)-5-(3-fluoro-4-hydroxy-5-isopropyl-phenyl)-6-methoxy-1-methyl-3,4-dihydro-1H-isoquinoline-2-carboxylate

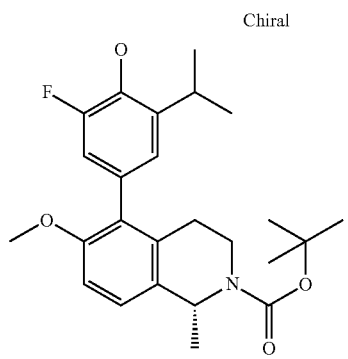 [SMILES: COc1ccc2c(c1-c1cc(F)c(O)c(C(C)C)c1)CCN(C(=O)OC(C)(C)C)[C@@H]2C]

Dissolve tert-butyl (1R)-5-(4-benzyloxy-3-fluoro-5-isopropenyl-phenyl)-6-methoxy-1-methyl-3,4-dihydro-1H-isoquinoline-2-carboxylate (270 mg, 0.25 mmol) in methanol (5 mL), add palladium (10% on C, 400 mg, 0.36 mmol). Stir the mixture under a hydrogen atmosphere (1 atm) at room temperature for 18 hours. Filter over Celite® and wash with ethanol. Remove the solvent in-vacuo to obtain the title compound as a brown oil (134 mg, 60% yield). MS(ESI) m/z: 374 [M+H−(t-Bu)]+.

Preparation 22

2-Fluoro-6-isopropyl-4-[(1R)-6-methoxy-1-methyl-1,2,3,4-tetrahydroisoquinolin-5-yl]phenol

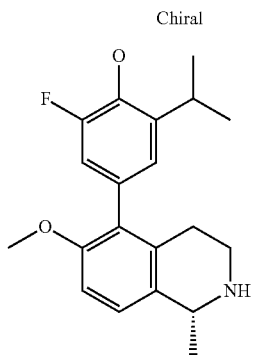 [SMILES: COc1ccc2c(c1-c1cc(F)c(O)c(C(C)C)c1)CCN[C@@H]2C]

Dissolve (1R)-5-(3-fluoro-4-hydroxy-5-isopropyl-phenyl)-6-methoxy-1-methyl-3,4-dihydro-1H-isoquinoline-2-carboxylate (134 mg, 0.25 mmol) in DCM (1.2 mL), add hydrochloric acid (4M in dioxane, 0.3 mL, 1 mmol). Stir the mixture at room temperature for 2 hours. Remove the solvent and purify by SCX eluting with methanol followed by 2N NH$_3$ in methanol. Combine the basic fractions and remove the solvent to obtain the title compound (120 mg, 68 mass %, 99% yield). MS(ESI) m/z: 330 [M+H]+

Preparation 23

4-[(1R)-2-[(4,4-Dimethylcyclohexyl)methyl]-6-methoxy-1-methyl-3,4-dihydro-1H-isoquinolin-5-yl]-2-fluoro-6-isopropyl-phenol

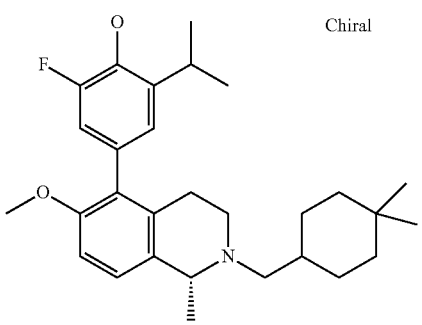

Add 4,4-dimethylcyclohexane-1-carbaldehyde (77 mg, 0.49 mmol) to a solution of 2-fluoro-6-isopropyl-4-[(1R)-6-methoxy-1-methyl-1,2,3,4-tetrahydroisoquinolin-5-yl]phenol (120 mg, 0.25 mmol) in DCM (3 mL). Stir the mixture at room temperature for 30 min and add sodium triacetoxyborohydride (100 mg, 0.47 mmol). Stir the reaction at room temperature for 4 hours. Add water and dichloromethane. Extract the aqueous layer with dichloromethane. Combine the organic layers, wash with saturated aqueous NaCl, dry over anhydrous magnesium sulphate, filter and concentrate in-vacuo. Purify by flash chromatography eluting with a gradient of 0% to 20% acetone in hexane to obtain the title compound as a colorless oil (90 mg, 78% yield). MS(ESI) m/z: 454 [M+H]+

EXAMPLE 4

Synthesis of 4-[(1R)-2-[(4,4-Dimethylcyclohexyl)methyl]-6-methoxy-1-methyl-3,4-dihydro-1H-isoquinolin-5-yl]-2-fluoro-6-isopropyl-phenol;hydrochloride

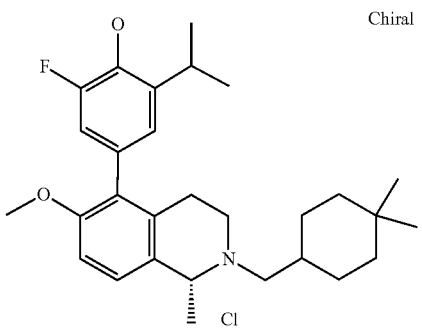

Dissolve 4-[(1R)-2-[(4,4-dimethylcyclohexyl)methyl]-6-methoxy-1-methyl-3,4-dihydro-1H-isoquinolin-5-yl]-2-fluoro-6-isopropyl-phenol (90 mg, 0.19 mmol) in ACN (1 mL), add hydrochloric acid (2 M in diethyl ether, 0.18 mL, 0.36 mmol). Sonicate the mixture at room temperature for 5 minutes. Remove solvents and dry the material at 45° C. in-vacuo for 18 hours to obtain the title compound as a tan solid (90 mg, 94% yield). MS(ESI) m/z: 454 [M+H]$^+$.

Biological Assays

Human GIP Receptor Potentiator Assay

GIP Receptor (GIPR) functional activity is determined using cAMP formation in an HEK293 clonal cell line expressing human GIPR (NCBI accession number NP_000155). The assay measures compound induced cAMP production in the presence of an EC$_{20}$ dose of the GIPR agonist GIP(1-42). The hGIPR receptor expressing cells are treated with 25 pM of GIP(1-42) (Labcyte Echo direct dilution) and a dose response of test compound (10 point concentration-response curve in DMSO, 3-fold Labcyte Echo direct dilution, 384 well plate Corning Cat #3570) in DMEM (Gibco Cat #31053) supplemented with 1× GlutaMAX™ (Gibco Cat #35050), 0.1% bovine casein (Sigma C4765-10ML), 250 μM IBMX (3-Isobutyl-1-methylxanthine, Acros Cat #228420010) and 20 mM HEPES (Gibco Cat #15630) in a 20 μL assay volume (final DMSO concentration is 1.0%). After a 30 min incubation at 37° C., the resulting increase in intracellular cAMP is quantitatively determined using the CisBio cAMP Dynamic 2 HTRF Assay Kit (62AM4PEJ). Briefly, cAMP levels within the cell are detected by adding the cAMP-d2 conjugate in cell lysis buffer (10 μL) followed by the antibody anti-cAMP-Eu$^{3+}$-Cryptate, also in cell lysis buffer (10 μL). The resulting competitive assay is incubated for at least 60 min at room temperature, then detected using a PerkinElmer Envision® instrument with excitation at 320 nm and emission at 665 nm and 620 nm. Envision units (emission at 665 nm/620 nm*10,000) are inversely proportional to the amount of cAMP present and are converted to nM cAMP per well using a cAMP standard curve. The amount of cAMP generated (nM) in each well is converted to a percent of the maximal response observed. A relative EC$_{50}$ value and percent top (E$_{max}$) are derived by non-linear regression analysis using the percent maximal response vs. the concentration of compound added, fitted to a four-parameter logistic equation. The EC$_{50}$ and E$_{max}$ data when the compounds of Examples 1 and 3 are tested in the cAMP assay described above are shown in Table 1. These data indicate that the compounds of Examples 1 and 3 are positive allosteric modulators of the human GIP receptor.

TABLE 1

HEK293 GIPR cell line intracellular cAMP response.

| Example | EC$_{50}$ (nM) and SEM (n) | E$_{max}$ (%) ± SEM (n) |
|---|---|---|
| Example 1 | 11.9 (5.6, n = 4) | 101 ± 7 (n = 4) |
| Example 3 | 37.5 (22.1, n = 4) | 91.0 ± 8 (n = 4) |

Human GLP-1 Receptor Potentiator Assay

GLP-1 Receptor (GLP-1R) functional activity is determined using cAMP formation in an HEK293 clonal cell line expressing human GLP-1R (NCBI accession number NP_002053). The assay measures compound induced cAMP production in the presence of an EC$_{20}$ dose of the GLP-1R agonist Oxyntomodulin. The GLP-1R expressing cells are treated with 5 nM of the GLP-1R agonist oxyntomodulin (Bachem Cat #H-6058) and a dose response of test compound (10 point concentration-response curve in DMSO, 3-fold Labcyte Echo direct dilution, 384 well plate Corning Cat #3570) in DMEM (Gibco Cat #31053) supplemented with 2 mM L-glutamine (Gibco Cat #25030), 0.25% fetal bovine serum (Gibco Cat #16000-044), 0.05% fraction V bovine serum albumin (Gibco Cat #15260), 1× Penicillin/Streptomycin (HyClone Cat #SV30010), 250 μM IBMX (3-Isobutyl-1-methylxanthine, Acros Cat #228420010) and 20 mM HEPES (HyClone Cat #SH30237.01) in a 20 μL assay volume (final DMSO concentration is 0.56%). After 60 min incubation at room temperature, the resulting increase in intracellular cAMP is quantitatively determined using a custom CisBio cAMP Hybrid HTRF Assay Kit (60MISZZZ). Briefly, cAMP levels within the cell are detected by adding the Dynamic 2 cAMP-d2 conjugate in cell lysis buffer (10 μL) followed by the HiRange antibody anti-cAMP-Eu$^{3+}$-Cryptate, also in cell lysis buffer (10 L). The resulting competitive assay is incubated for at least 60 min at RT, then detected using a PerkinElmer Envision® instrument with excitation at 320 nm and emission at 665 nm and 620 nm. Envision units (emission at 665 nm/620 nm*10,000) are inversely proportional to the amount of cAMP present and are converted to nM cAMP per well using a cAMP standard curve. The amount of cAMP generated (nM) in each well is converted to a percent of the maximal response observed. A relative EC$_{50}$ value and percent top (E$_{max}$) are derived by non-linear regression analysis using the percent maximal response vs. the concentration of compound added, fitted to a four-parameter logistic equation. The EC$_{50}$ and E$_{max}$ data when the compound of Example 2 is tested in the cAMP assay described above is shown in Table 2. This data indicates that the compound of Example 2 is a positive allosteric modulator of the human GLP-1 receptor.

TABLE 2

HEK293 GLP-1R cell line intracellular cAMP response.

| Example | EC$_{50}$ (nM) and SEM (n) | E$_{max}$ (%) ± SEM (n) |
|---|---|---|
| Example 2 | 15.7 (8.1, n = 10) | 181 ± 35 (n = 10) |

Certain embodiments contemplated by the invention are the following:

1. A compound of the formula:

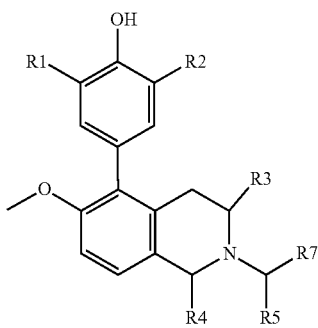

wherein
R1 is selected from the group consisting of F and H;
R2 is selected from the group consisting of CH$_3$, CH$_3$CHCH$_3$ and —NHCH$_2$CH(CH$_3$)$_2$;

R3 is selected from the group consisting of H and —CH$_2$OCH$_3$;
R4 is selected from the group consisting of H and CH$_3$;
R5 is selected from the group consisting of H and CH$_3$;
R6 is selected from the group consisting of H and OH;
R7 is selected from the group consisting of

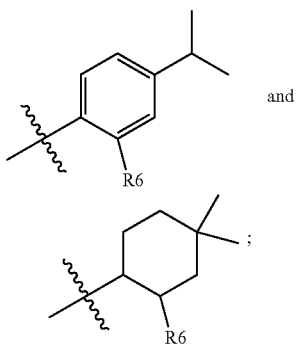

and or a pharmaceutically acceptable salt thereof.

2. A compound of the formula:

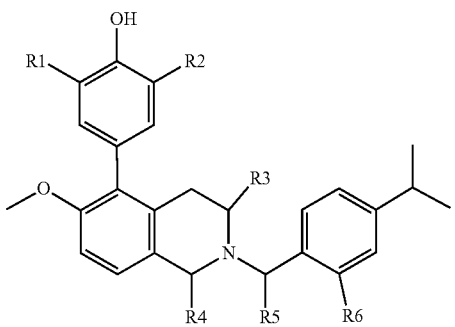

wherein
R1 is selected from the group consisting of F and H;
R2 is selected from the group consisting of CH$_3$ and —NHCH$_2$CH(CH$_3$)$_2$;
R3 is selected from the group consisting of H and —CH$_2$OCH$_3$;
R4 is selected from the group consisting of H and CH$_3$;
R5 is selected from the group consisting of H and CH$_3$;
R6 is selected from the group consisting of H and OH; or
a pharmaceutically acceptable salt thereof.

3. The compound of any one of embodiments 1 to 2 wherein R4 is CH$_3$, or a pharmaceutically acceptable salt thereof.

4. The compound of any one of embodiments 1 to 3 wherein R5 is CH$_3$, or a pharmaceutically acceptable salt thereof.

5. The compound of any one of embodiments 1 to 4 wherein R6 is H, or a pharmaceutically acceptable salt thereof.

6. The compound of any one of embodiments 1 to 5 wherein R1 is F, or a pharmaceutically acceptable salt thereof.

7. The compound of any one of embodiments 1 to 6 wherein R3 is H, or a pharmaceutically acceptable salt thereof.

8. The compound of any one of embodiments 1 to 7 wherein R2 is NHCH$_2$CH(CH$_3$)$_2$, or a pharmaceutically acceptable salt thereof.

9. The compound of any one of embodiments 1 to 7 wherein R2 is CH$_3$, or a pharmaceutically acceptable salt thereof.

10. The compound of embodiment 1 wherein the compound is selected from the group consisting of

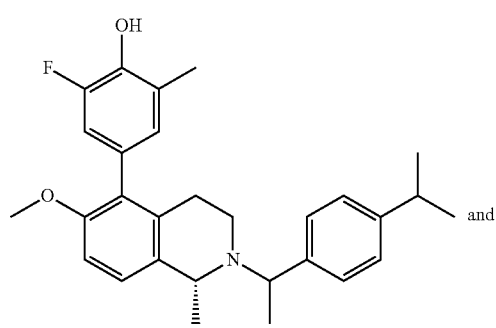

and

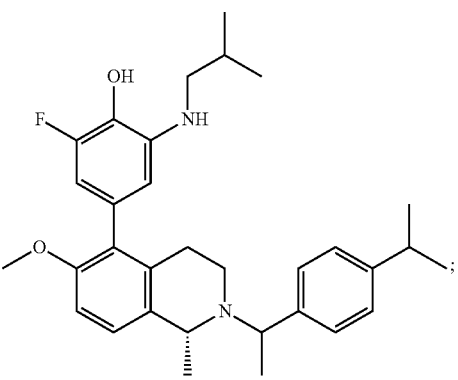

or a pharmaceutically acceptable salt thereof.

11. The compound of embodiment 10 wherein the compound is

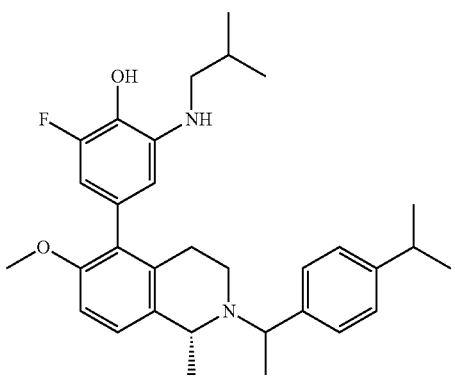 [SMILES: COc1ccc2c(c1-c1cc(F)c(O)c(NCC(C)C)c1)CCN(C(C)c1ccc(C(C)C)cc1)[C@@H]2C]

or a pharmaceutically acceptable salt thereof.

12. The compound of embodiment 1 wherein the compound is

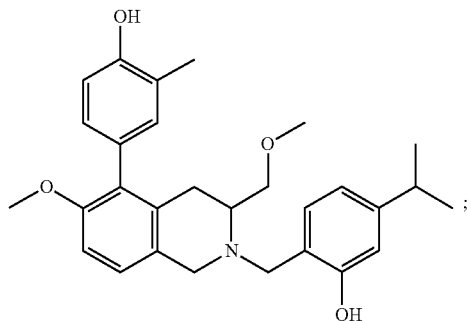 [SMILES: COCC1Cc2c(ccc(OC)c2-c2ccc(O)c(C)c2)CN1Cc1ccc(C(C)C)cc1O]

or a pharmaceutically acceptable salt thereof.

13. The compound of embodiment 12 wherein the compound is:

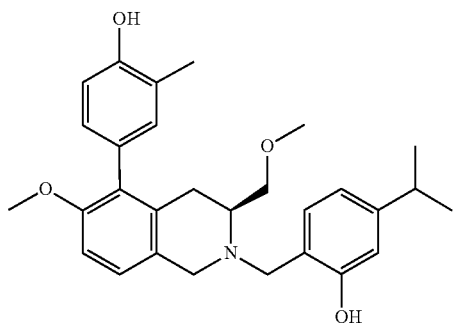 [SMILES: COC[C@@H]1Cc2c(ccc(OC)c2-c2ccc(O)c(C)c2)CN1Cc1ccc(C(C)C)cc1O]

or a pharmaceutically acceptable salt thereof.

14. A compound of any one of embodiments 1 to 13 wherein the compound is a hydrochloride salt.

15. A pharmaceutical composition comprising a compound, or a pharmaceutically acceptable salt thereof, of any one of embodiments 1 to 14 and at least one pharmaceutically acceptable carrier, diluent, or excipient.

16. A method for treating type II diabetes mellitus in a mammal comprising administering to the mammal an effective amount of a compound of any one of embodiments 1 to 14, or a pharmaceutically acceptable salt thereof.

17. A compound, or a pharmaceutically acceptable salt thereof, of any one of embodiments 1 to 14 for use in therapy.

18. A compound, or a pharmaceutically acceptable salt thereof, of any one of embodiments 1 to 14 for use in the treatment of type II diabetes mellitus.

19. Use of a compound, or a pharmaceutically acceptable salt thereof, of any one of embodiments 1 to 14 in the manufacture of a medicament for the treatment of type II diabetes mellitus.

20. A compound, or pharmaceutically acceptable salt thereof, of any one of embodiments 1 to 14, for use in positive allosteric modulation of a receptor selected from the group consisting of GLP1, GIP, and glucagon.

21. A compound, or pharmaceutically acceptable salt thereof, of any one of embodiments 2 to 14, for use in positive allosteric modulation of a GLP1 receptor.

What is claimed is:

1. A compound of the formula:

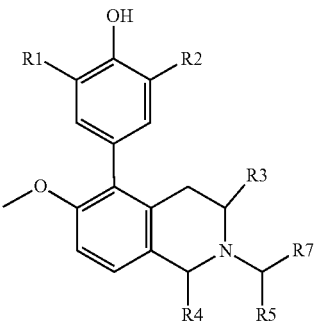

wherein
R1 is selected from the group consisting of F and H;
R2 is selected from the group consisting of $CH_3$, $CH_3CHCH_3$ and $-NHCH_2CH(CH_3)_2$;
R3 is selected from the group consisting of H and $-CH_2OCH_3$;
R4 is selected from the group consisting of H and $CH_3$;
R5 is selected from the group consisting of H and $CH_3$;
R6 is selected from the group consisting of H and OH;
R7 is selected from the group consisting of

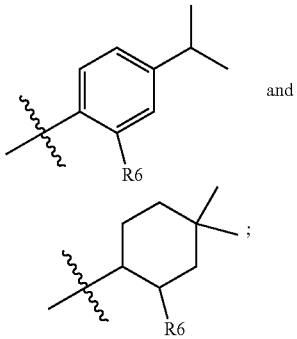

or a pharmaceutically acceptable salt thereof.

2. A compound of the claim 1, wherein the compound is of the formula:

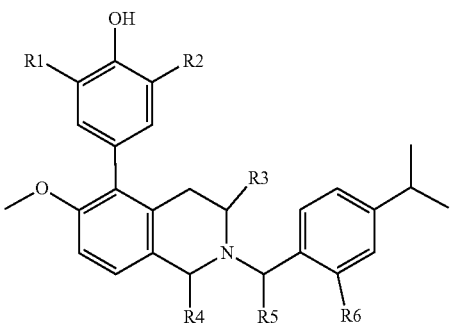

wherein
R1 is selected from the group consisting of F and H;
R2 is selected from the group consisting of CH3 and $-NHCH_2CH(CH_3)_2$;

R3 is selected from the group consisting of H and —CH$_2$OCH$_3$;

R4 is selected from the group consisting of H and CH$_3$;

R5 is selected from the group consisting of H and CH$_3$;

R6 is selected from the group consisting of H and OH; or a pharmaceutically acceptable salt thereof.

3. The compound as claimed by claim 1 wherein R4 is CH$_3$, or a pharmaceutically acceptable salt thereof.

4. The compound as claimed by claim 1 wherein R5 is CH$_3$, or a pharmaceutically acceptable salt thereof.

5. The compound as claimed by claim 1 wherein R6 is H, or a pharmaceutically acceptable salt thereof.

6. The compound as claimed by claim 1 wherein R1 is F, or a pharmaceutically acceptable salt thereof.

7. The compound as claimed by claim 1 wherein R3 is H, or a pharmaceutically acceptable salt thereof.

8. The compound as claimed claim 1 wherein R2 is NHCH$_2$CH(CH$_3$)$_2$, or a pharmaceutically acceptable salt thereof.

9. The compound as claimed by claim 1 wherein R2 is CH$_3$, or a pharmaceutically acceptable salt thereof.

10. The compound as claimed by claim 1 wherein the compound is selected from the group consisting of

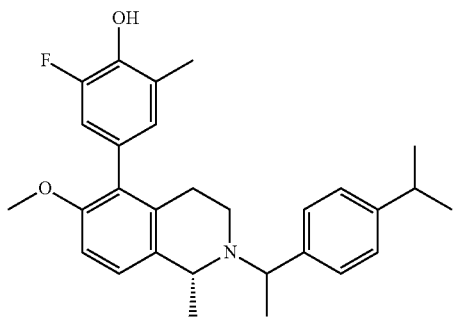

and

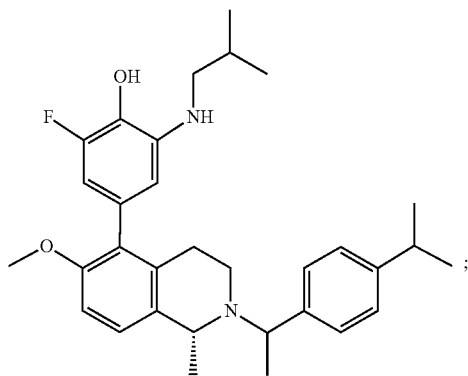

or a pharmaceutically acceptable salt thereof.

11. The compound as claimed by claim 10 wherein the compound is

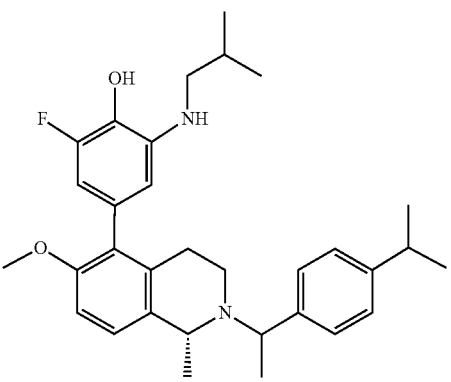 [SMILES: COc1ccc2c(c1-c1cc(F)c(O)c(NCC(C)C)c1)CCN(C(C)c1ccc(C(C)C)cc1)[C@@H]2C]

or a pharmaceutically acceptable salt thereof.

12. The compound as claimed by claim 1 wherein the compound is

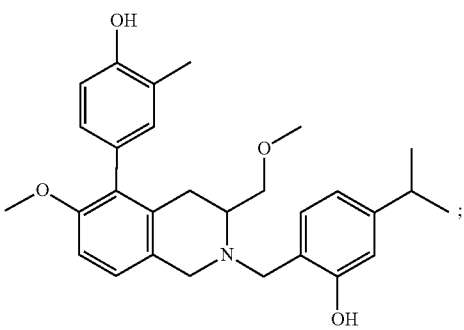 [SMILES: COCC1Cc2c(ccc(OC)c2-c2ccc(O)c(C)c2)CN1Cc1ccc(C(C)C)cc1O]

or a pharmaceutically acceptable salt thereof.

13. The compound as claimed by claim 12 wherein the compound is:

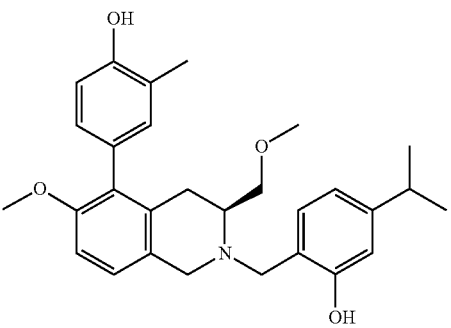 [SMILES: COC[C@@H]1Cc2c(ccc(OC)c2-c2ccc(O)c(C)c2)CN1Cc1ccc(C(C)C)cc1O]

or a pharmaceutically acceptable salt thereof.

14. A compound as claimed by claim 13 wherein the compound is a hydrochloride salt.

15. A compound as claimed by claim 1, wherein the compound is

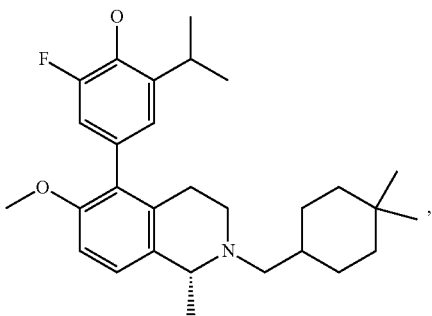

or a pharmaceutically acceptable salt thereof.

16. A compound as claimed by claim 15 wherein the compound is a hydrochloride salt.

17. A pharmaceutical composition comprising a compound, or a pharmaceutically acceptable salt thereof, as claimed by claim 1 and at least one pharmaceutically acceptable carrier, diluent, or excipient.

18. A method for treating type II diabetes mellitus in a mammal comprising administering to the mammal in need thereof, an effective amount of a compound as claimed by claim 1, or a pharmaceutically acceptable salt thereof.

19. A compound of claim 1, or a pharmaceutically acceptable salt thereof, for use as a positive allosteric modulator of a receptor selected from the group consisting of GLP1, GIP, and glucagon.

20. A compound, or a pharmaceutically acceptable salt thereof, as claimed by claim 1 for use in therapy.

21. A compound, or a pharmaceutically acceptable salt thereof, as claimed by claim 1 for use in the treatment of type II diabetes mellitus.

22. A compound, or a pharmaceutically acceptable salt thereof, as claimed by claim 1 for use in the manufacture of a medicament for the treatment of type II diabetes mellitus.

* * * * *